(12) United States Patent
Liu et al.

(10) Patent No.: US 9,512,837 B2
(45) Date of Patent: *Dec. 6, 2016

(54) OIL PUMP, ENGINE COVER AND ENGINE COMPRISING THE SAME

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Jing Liu, Shenzhen (CN); Junli Zheng, Shenzhen (CN); Haibin Li, Shenzhen (CN); Jinchen Lin, Shenzhen (CN)

(73) Assignees: SHENZHEN BYD AUTO R&D COMPANY LIMITED, Shenzhen, Guangdong (CN); BYD COMPANY LIMITED, Shenzhen, Guangdong (CN)

(*) Notice: Subject to any disclaimer, the term of this patent is extended or adjusted under 35 U.S.C. 154(b) by 88 days.

This patent is subject to a terminal disclaimer.

(21) Appl. No.: 14/380,053

(22) PCT Filed: Mar. 28, 2013

(86) PCT No.: PCT/CN2013/073358
§ 371 (c)(1),
(2) Date: Aug. 20, 2014

(87) PCT Pub. No.: WO2013/143479
PCT Pub. Date: Oct. 3, 2013

(65) Prior Publication Data
US 2015/0285244 A1    Oct. 8, 2015

(30) Foreign Application Priority Data

Mar. 29, 2012  (CN) .......................... 2012 1 0087031
Mar. 29, 2012  (CN) .......................... 2012 1 0087043
Mar. 29, 2012  (CN) .................... 2012 2 0124123 U
Mar. 29, 2012  (CN) .................... 2012 2 0124135 U

(51) Int. Cl.
F03C 2/00        (2006.01)
F03C 4/00        (2006.01)
(Continued)

(52) U.S. Cl.
CPC ................. *F04C 2/10* (2013.01); *F04C 2/084* (2013.01); *F04C 2/086* (2013.01); *F04C 2/102* (2013.01);
(Continued)

(58) Field of Classification Search
CPC ........ F04C 2/084; F04C 2/086; F04C 2/102; F04C 14/26; F04C 29/0042; F04C 29/02; F04C 29/025; F04C 29/028; F04C 29/04; F04C 29/06; F04C 29/065; F16N 13/20
USPC ......... 418/61.3, 166, 171, 132, 270, 180, 88
See application file for complete search history.

(56) References Cited

U.S. PATENT DOCUMENTS 5,096,398 A    3/1992  Cozens
7,174,875 B2   2/2007  Liang et al.
(Continued)

FOREIGN PATENT DOCUMENTS

CN    201066030 Y    5/2008
CN    201087731 Y    7/2008
(Continued)

OTHER PUBLICATIONS

Shenzhen BYD Auto R&D Company Limited, International Search Report, PCT/CN2013/73354, Jul. 18, 2013, 5 pgs.
(Continued)

*Primary Examiner* — Theresa Trieu
(74) *Attorney, Agent, or Firm* — Morgan, Lewis & Bockius LLP

(57) ABSTRACT

An oil pump is provided. The oil pump comprises a shell, a rotor mounting part disposed at an end of the shell, and a rotor mechanism disposed on the rotor mounting part. The shell has an inlet and an outlet and defines a low-pressure oil chamber and a high-pressure oil chamber therein. The high-pressure oil chamber and the low-pressure oil chamber are located at the same side of a periphery of the rotor mounting part. An engine cover comprising the oil pump and an engine comprising the engine cover are also provided.

14 Claims, 3 Drawing Sheets

(51) Int. Cl.
*F04C 2/00* (2006.01)
*F04C 15/00* (2006.01)
*F04C 2/10* (2006.01)
*F04C 29/02* (2006.01)
*F04C 29/04* (2006.01)
*F16N 13/20* (2006.01)
*F04C 2/08* (2006.01)
*F04C 14/26* (2006.01)
*F04C 29/00* (2006.01)
*F01M 1/02* (2006.01)

(52) U.S. Cl.
CPC ........... *F04C 14/26* (2013.01); *F04C 29/0042* (2013.01); *F04C 29/02* (2013.01); *F04C 29/025* (2013.01); *F04C 29/028* (2013.01); *F04C 29/04* (2013.01); *F16N 13/20* (2013.01); *F01M 2001/0238* (2013.01); *F04C 2210/206* (2013.01)

(56) References Cited

U.S. PATENT DOCUMENTS

| | | | |
|---|---|---|---|
| 7,559,754 B2* | 7/2009 | Miyake | F04C 2/102 418/61.3 |
| 2001/0027811 A1 | 10/2001 | Hirano et al. | |
| 2007/0092392 A1 | 4/2007 | Kurokawa | |
| 2012/0082579 A1* | 4/2012 | Mori | F04C 2/084 418/166 |

FOREIGN PATENT DOCUMENTS

| | | |
|---|---|---|
| CN | 201372923 Y | 12/2009 |
| CN | 101629500 A | 1/2010 |
| CN | 101865003 A | 10/2010 |
| CN | 201723266 U | 1/2011 |
| CN | 201738961 U | 2/2011 |
| CN | 201771570 U | 3/2011 |
| CN | 201778850 U | 3/2011 |
| CN | 201778850 U | 3/2011 |
| CN | 201892018 U | 7/2011 |
| CN | 102364205 A | 2/2012 |
| CN | 202546203 U | 11/2012 |
| CN | 202546211 U | 11/2012 |
| CN | 202596831 U | 12/2012 |
| CN | 202596832 U | 12/2012 |
| DE | 19646359 A1 | 5/1998 |
| JP | 05-026175 A | 2/1993 |
| JP | 05-033779 A | 2/1993 |
| JP | 08-100620 A | 4/1996 |
| JP | H09203308 A | 8/1997 |
| JP | 2000220578 A | 8/2000 |
| JP | 2011038403 A | 2/2011 |
| KR | 20040044645 A | 5/2004 |

OTHER PUBLICATIONS

Shenzhen BYD Auto R&D Company Limited, International Search Report, PCT/CN2013/73358, Jul. 11, 2013, 5 pgs.
Shenzhen BYD Auto R&D Company Limited, International Search Report, PCT/CN2013/73368, Jul. 11, 2013, 5 pgs.
Liu, Office Action, U.S. Appl. No. 14/380,052, Jul. 28, 2016, 18 pgs.

* cited by examiner

OIL PUMP, ENGINE COVER AND ENGINE COMPRISING THE SAME

CROSS REFERENCE TO RELATED APPLICATIONS

This application is a United States National Stage Application filed under 35 U.S.C. §371 of PCT Patent Application Serial No. PCT/CN2013/073358 filed on Mar. 28, 2013, which claims priority to and benefit of Chinese Patent Application Serial No. 201210087031.6, Chinese Patent Application Serial No. 201220124123.2, Chinese Patent Application Serial No. 201210087043.9, and Chinese Patent Application Serial No. 201220124135.5, all filed on Mar. 29, 2012, the entire contents of which are incorporated herein by reference.

This application relates to U.S. patent application Ser. No. 14/380,052 entitled "OIL PUMP, ENGINE COVER AND ENGINE COMPRISING THE SAME" filed on Aug. 20, 2014 and U.S. patent application Ser. No. 14/380,056 entitled "OIL PUMP, ENGINE COVER AND ENGINE COMPRISING THE SAME" filed on Aug. 20, 2014, the entire contents of which are incorporated herein by reference.

FIELD

The present disclosure relates to field of automobile, particularly to an oil pump, an engine cover comprising the oil pump, and an engine comprising the engine cover.

BACKGROUND

The statements in this section merely provide background information related to the present disclosure and may not constitute prior art.

Generally, the oil pump of a vehicle engine is usually a rotor pump. The rotor pump comprises a shell, and inner and outer rotors eccentrically disposed in the shell. The shell comprises an inlet connected to a low-pressure oil chamber, and an outlet connected to a high-pressure oil chamber. When the engine is in operation, the inner rotor is driven to rotate with the outer rotor. With the rotation of the inner rotor and the outer rotor, the low-pressure oil injected through the inlet is transformed to high-pressure oil and then discharged from the outlet. However, in conventional oil pumps, the high-pressure oil chamber and the low-pressure oil chamber are usually disposed on the opposite sides, so that the structure of the oil pump is not compact and occupies a big space, which is disadvantageous for miniaturization of the oil pump as well as the engine having the oil pump.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In viewing thereof, the present disclosure is directed to solving at least one of the problems existing in the art. Accordingly, an oil pump is provided. The oil pump has a compact structure and occupies a small space.

Embodiments according to one aspect of the present disclosure provide an oil pump. The oil pump may comprise a shell, a rotor mounting part disposed at an end of the shell and a rotor mechanism disposed on the rotor mounting part. The shell has an inlet and an outlet and defines a low-pressure oil chamber and a high-pressure oil chamber therein. The low-pressure oil chamber has a low-pressure oil passage connected to the inlet, and the high-pressure oil chamber has a high-pressure oil passage connected to the outlet. The high-pressure oil chamber and the low-pressure oil chamber are located at the same side of a periphery of the rotor mounting part. The rotor mounting part has a rotor supporting structure.

By providing the high-pressure oil chamber and the low-pressure oil chamber at the same side of the periphery of the rotor mounting part, the oil pump has a compact structure and occupies a small space, which is advantageous for miniaturization of the oil pump as well as the engine having the oil pump.

Embodiments according to another aspect of the present disclosure provide an engine cover. The engine cover comprises an engine cover body and the oil pump whose shell is integrally formed with the engine cover body.

Embodiments according to a further aspect of the present disclosure provide an engine comprising the engine cover.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings, in which.

DETAILED DESCRIPTION

Figure 1:
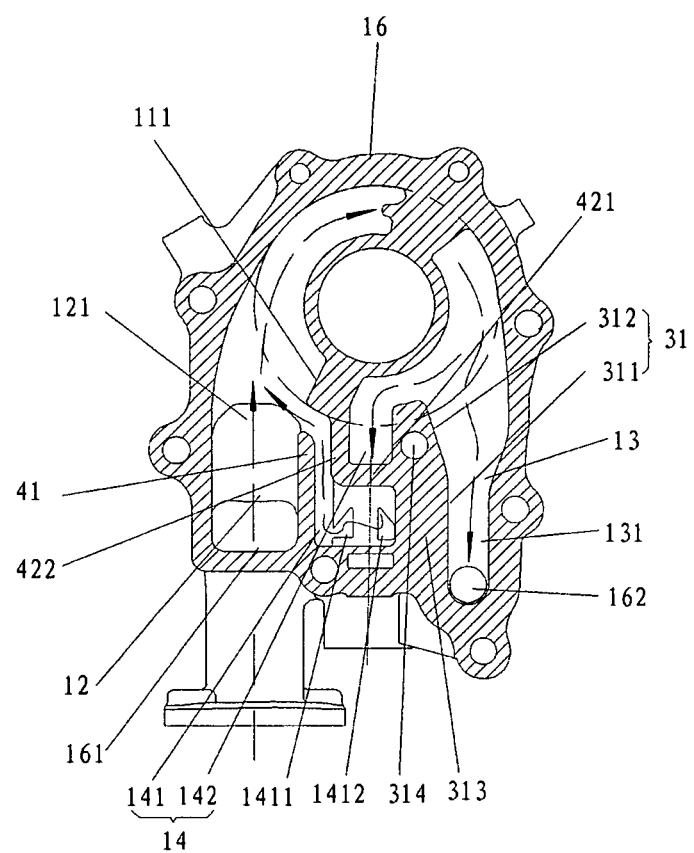
FIG. 1 is a front cross-sectional view of a cover of the oil pump according to an embodiment of the present disclosure, in which the arrows shows a flowing direction of the oil.
Figure 2:
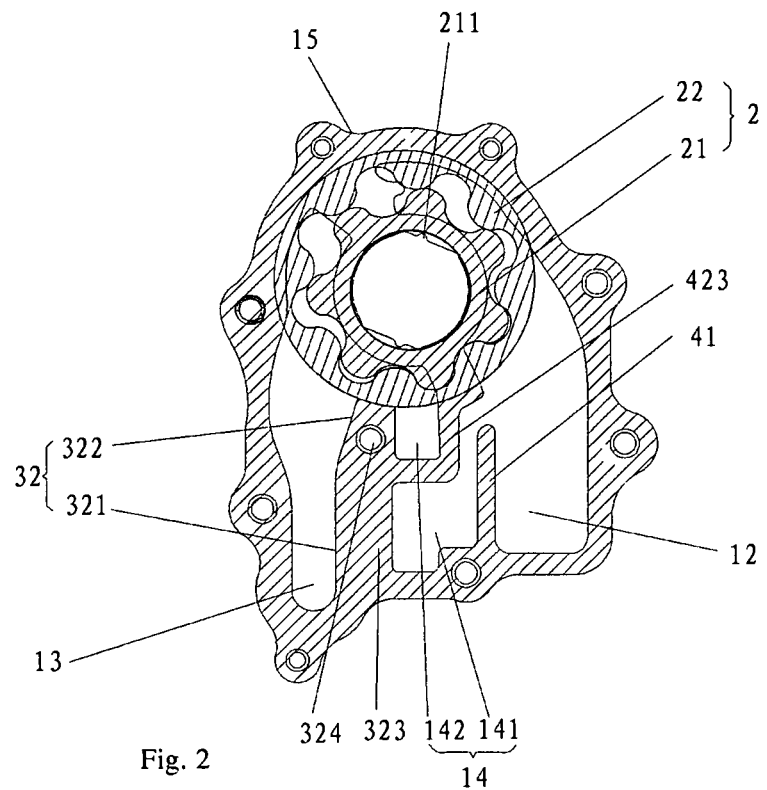
FIG. 2 is a front cross-sectional view of a shell of the oil pump according to an embodiment of the present disclosure.
Figure 3:
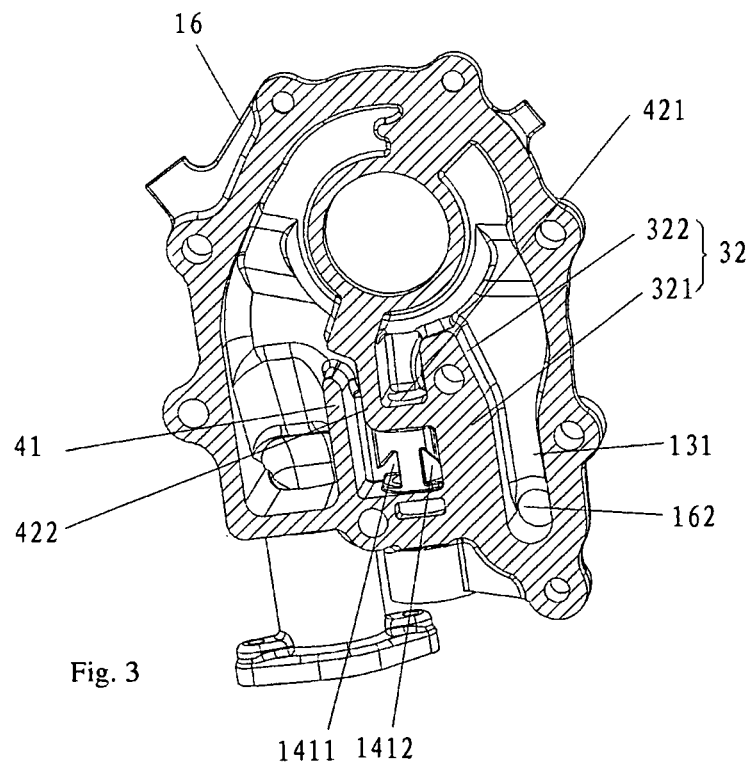
FIG. 3 is a perspective view of the cover of the oil pump according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. It is to be understood that, the embodiments described herein are merely used to generally understand the present disclosure, but shall not be construed to limit the present disclosure.

In the following, detailed description of an oil pump will be given, in which like numerals refer to like elements through the accompanying figures.

As shown in FIGS. 1-4, the oil pump according to an embodiment of the present disclosure comprises a shell 1, a rotor mounting part 11 disposed at an end of the shell 1, and a rotor mechanism 2 disposed on the rotor mounting part 11. The shell 1 has an inlet 161 and an outlet 162 and defines a low-pressure oil chamber 12 and a high-pressure oil chamber 13 therein. The low-pressure oil chamber 12 has a low-pressure oil passage 121 connected to the inlet 161, and the high-pressure oil chamber 13 has a high-pressure oil passage 131 connected to the outlet 162. The high-pressure oil chamber 13 and the low-pressure oil chamber 12 are located at the same side of a periphery of the rotor mounting part 11. The rotor mounting part 11 has a rotor supporting structure 111.

By providing the high-pressure oil chamber 13 and the low-pressure oil chamber 12 at the same side of the periphery of the rotor mounting part 11, the oil pump has a compact structure and occupies a small space, which is advantageous for miniaturization of the oil pump as well as the engine having the oil pump.

In some embodiments, the oil pump comprises a partition wall 3 disposed between the low-pressure oil chamber 12 and the high-pressure oil chamber 13 for separating the low-pressure oil chamber 12 and the high-pressure oil chamber 13.

In some embodiments, a buffer chamber 14 is defined between the partition wall 3 and the low-pressure oil chamber 12, and a flow limiting wall 42 is disposed in the buffer chamber 14. The flow limiting wall 42 divides the buffer chamber 14 into an inflowing buffer chamber 142 and an outflowing buffer chamber 141 connected to the inflowing buffer chamber 142 via a pressure relief mechanism 6.

In some embodiments, a barrier wall 41 is disposed between the outflowing buffer chamber 141 and the low-pressure oil chamber 12.

In some embodiments, the rotor mounting part 11 is disposed at an end of the shell 1. The high-pressure oil chamber 13, the buffer chamber 14 and the low-pressure oil chamber 12 are located at the same side of the periphery of the rotor mounting part 11. For example, the high-pressure oil chamber 13 and the low-pressure oil chamber 12 are disposed at the same side of the periphery of the rotor mounting part 11 with the buffer chamber 14 located therebetween.

In some embodiments, the shell 1 comprises a main shell body 15 and a cover 16 fitted thereto, for example, joined with the main shell body 15. The inlet 161 and the outlet 162 are formed in the cover 16.

In some embodiments, the partition wall 3 comprises a first partition wall portion 31 formed on the cover 16, and a second partition wall portion 32 formed on the main shell body 15. The second partition wall portion 32 has a fluid-tight contact with the first partition wall portion 31.

The buffer chamber 14 in the embodiments of the present disclosure is adapted for releasing the pressure of the oil in the high-pressure oil chamber 13. With the buffer chamber 14 defined between the high-pressure oil chamber 13 and the low-pressure oil chamber 12, when the oil pressure in the high-pressure oil chamber 13 reaches a predetermined pressure, part of the high-pressure oil (also referred as pressure relief oil hereinafter) in the high-pressure oil chamber 13 flows into the buffer chamber 14, thus releasing the oil pressure in the high-pressure oil chamber 13. In addition, by providing the buffer chamber 14, the flowing direction of the pressure relief oil is changed and the flowing speed thereof is reduced, thus stabilizing the flow of the pressure relief oil.

Further, with the barrier wall 41 disposed between the outflowing buffer chamber 141 and the low-pressure oil chamber 12, the pressure relief oil released from the inflowing buffer chamber 142 into outflowing buffer chamber 141 may flow along the barrier wall 41 smoothly and then enter into the low-pressure oil chamber 12, thus avoiding the unnecessary eddy generated by the pressure relief oil impacting upon the low-pressure oil entering the low-pressure oil chamber 12 through the inlet 161, so that the efficiency of the oil pump can be improved.

In some embodiments, one end of the flow limiting wall 42 is connected to a lower portion of the rotor mounting part 111, and the other end of the flow limiting wall 42 is connected to the partition wall 3. The mounting part 111, the flow limiting wall 42, and the partition wall 3 define the inflowing buffer chamber 142. The flow limiting wall 42, the partition wall 3, and the barrier wall 41 define the outflowing buffer chamber 141. A through hole 421 connecting the inflowing buffer chamber 142 and the outflowing buffer chamber 141 is formed in the flow limiting wall 42, and the pressure relief mechanism 6 is disposed in the through hole 421.

Because the pressure and the speed of the pressure relief oil are higher than those of the oil that enters the low-pressure oil chamber 12 through the inlet 16 respectively, the pressure relief oil may impact upon the oil flowing in the main flowing direction in the low-pressure oil passage 121 when the pressure relief oil flows directly into the low-pressure oil passage 121 of the low-pressure oil chamber 12, thus causing unnecessary eddy and reducing the efficiency of the oil pump. In order to reduce the impact force applied by the pressure relief oil onto the oil in the low-pressure oil passage 121 and to avoid the unnecessary eddy and to improve the efficiency, the barrier wall 41 is disposed at a side of the inlet 161 and parallel to an inflowing direction (main flowing direction) of the oil entering into the low-pressure oil chamber 12 through the inlet 161. A top end surface of the barrier wall 41 has an arc surface, thus facilitating a smooth flow of the pressure relief oil.

In some embodiments, the low-pressure oil passage 121 and the high-pressure oil passage 131 may be disposed in the cover 16.

In some embodiments, the flow limiting wall 42 may comprise a cover flow limiting wall part 422 and a body flow limiting wall part 423 joined with the cover flow limiting wall part 422. The cover flow limiting wall part 422 is formed on the cover 16, and the body flow limiting wall part 423 is formed on the main shell body 15.

In some embodiments, the through hole 421 connecting the inflowing buffer chamber 142 and the outflowing buffer chamber 141 is formed in the cover flow limiting wall part 422, and the pressure relief mechanism 6 is disposed in the through hole 421.

In some embodiments, the first partition wall portion 31 comprises a first main body portion 311 adjacent to the outlet 162, and a first extending portion 312 extending from the first main body portion 311 to the rotor mounting part 11. The second partition wall portion 32 comprises a second main body portion 321 adjacent to the outlet 162, and a second extending portion 322 extending from the second main body portion 321 to the rotor mounting part 11.

In some embodiments, a side (the right side in FIG. 1) of the first extending portion 312 and a side (the left side in FIG. 2) of the second extending portion 322 facing to the high pressure oil chamber is tilted, so as to facilitate to guide the flowing of the oil in the high-pressure oil chamber 13. Specifically, the tilted sides of the first extending portion 312 and the second extending portion 322 are tilted towards the high-pressure oil chamber 13.

In some embodiments, the first partition wall portion 31 has a first smooth partition surface 313, and the second partition wall portion 32 has a second smooth partition surface 323 joined with the first partition surface 313. Thereby, the first partition wall portion 31 may be joined more tightly with the second partition wall portion 32.

In some embodiments, the first and second partition wall portions 31, 32 each have a bolt hole. The bolt hole comprises a first bolt hole portion 314 formed in the first partition wall portion 31 and a second bolt hole portion 324 formed in the second partition wall portion 32 and corresponding to the first bolt hole portion 314. Thereby, the first and second partition wall portions 31, 32 may be secured by a bolt passing through the bolt hole, thus enhancing the joining force between the first partition wall portion 31 and the second partition wall portion 32, and further preventing the oil leakage.

Alternatively, a plurality of bolt holes may be formed in different positions around the outlet 162. In that way, the joining force between the first partition wall portion 31 and the second partition wall portion 32 may be more uniform. In addition, it is advantageous for isolation between the low-pressure and high-pressure oil chambers 12, 13, and the oil leakage may be further prevented.

In an embodiment, a width of the partition wall 3 is 1.5 to 2 times of a maximum value of a diameter of the bolt hole.

In some embodiments, the bolt hole is formed at an end of the partition wall adjacent to the rotor mounting part 11. In an embodiment, the bolt hole is located in the middle of the partition wall. By way of example and without limiting, the bolt hole is located in the extension portion of the partition wall and at a side adjacent to the rotor mounting part 11. Thereby, the stability of the oil pump may be improved.

In some embodiments, the outflowing buffer chamber 141 may comprise a pressure relief channel adapted to change a flowing direction of the pressure relief oil in the outflowing buffer chamber 141. The pressure relief channel may be formed in the cover 16. The pressure relief channel may ensure a smooth flow of the pressure relief oil along the axial direction of the pressure relief mechanism 6.

Figure 4:
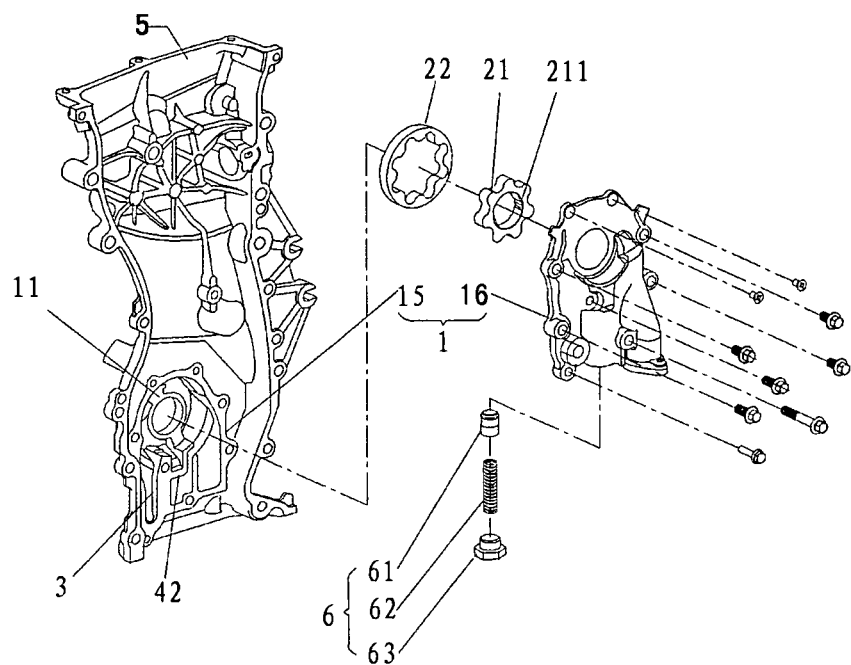
FIG. 4 is an exploded view of the engine cover according to an embodiment of the present disclosure.

The pressure relief mechanism 6 comprises a relief valve 61, a spring mechanism 62, and a spring base 63, as shown in FIG. 4.

In some embodiments, the pressure relief channel comprises a first pressure relief port 1411 and a second pressure relief port 1412 disposed symmetrically to each other relative to the center axis of the through hole 421. In some embodiments, the first and second pressure relief ports 1411, 1412 each have a right-angled trapezoid shaped cross-section. Those having ordinary skill in the art will appreciate that the cross-section of the first and second pressure relief ports 1411, 1412 may be configured as other shapes such as circular shape or triangular shape.

In some embodiments, the rotor mechanism 2 comprises an inner rotor 21 and an outer rotor 22. The inner rotor 21 is mounted on a rotor shaft. As shown in FIG. 4, a groove 211 is formed in the inner wall of the inner rotor 21, and the inner rotor 21 is mounted on the rotor shaft by a spline or a pin fitted in the groove 211. The outer rotor 22 and the inner rotor 21 may be eccentrically disposed relative to each other in the shell 1. The rotation of the inner rotor 21 drives the out rotor 22 to rotate. In an embodiment, the inner rotor 21 has seven teeth, and the outer rotor 22 has eight teeth. In that way, the inner rotor 21 driven by the rotor shaft may drive the outer rotor 22 to rotate in the same direction but not synchronized with the inner rotor 21. Those having ordinary skill in the art will appreciate that, by increasing the number of the teeth of the outer rotor 22, the oil pump has a more compact structure, the oil supplying amount is large, the oil supplying is uniform, the noise is reduced and the vacuum degree for pumping oil is increased. Thereby, a circular flowing of the oil in the lubricating system may be ensured. The tooth of each of the inner and outer rotors 21, 22 is designed to ensure that the inner and outer rotors 21, 22 are in constant point-contact when the inner and outer rotors 21, 22 rotate to any angle.

As shown in FIG. 1, the arrow shows the flowing direction of the oil. Due to disengagement of the inner and outer rotors 21, 22, the volume of the low-pressure oil chamber 12 connected to the inlet 161 is gradually increased, and then a vacuum is generated to suck the oil into the low-pressure oil chamber 12. With the continuing rotation of the rotor mechanism 2, the oil is brought into the side of the rotor mechanism 2 adjacent to the outlet 162. Then, the inner and outer rotors 21, 22 may engage each other, and the pressure of the oil is increased. In this way, the oil may be pushed out through gaps between the teeth of the inner and outer rotors 21, 22 and flow into the high-pressure oil chamber 13 and the inflowing buffer chamber 142 respectively. The oil in the high-pressure oil chamber 13 flows out via the outlet 162. When the pressure of the oil is greater than a predetermined value, the relief valve 61 may be opened and part of the oil may flow from the inflowing buffer chamber 142 into the outflowing buffer chamber 141.

According to embodiments of the present disclosure, the inflowing buffer chamber 142 and the outflowing buffer chamber 141 provide two stages of buffering for the pressure relief oil, so that the flowing direction of the pressure relief oil may be changed, and the pressure and the speed of the pressure relief oil are also reduced. The flowing direction of the pressure relief oil in the outflowing buffer chamber 141 is further changed via the pressure relief channel, so that the pressure relief oil may flow more stably. Because the barrier wall 41 is parallel to the flowing direction of the oil flowing into the low-pressure oil chamber 12 via the inlet 161, the pressure relief oil does not apply a greater impact onto the oil in the low-pressure oil chamber 12 when the pressure relief oil is flowing between the barrier wall 41 and the flow limiting wall 42. The pressure relief oil together with the oil entering the low-pressure oil chamber 12 via the inlet 162 may enter into a next cycle.

According to embodiments of the present disclosure, with the partition wall 3, the high-pressure oil chamber 13 and the low-pressure oil chamber 12 are completely separated or isolated from each other when the pressure relief valve 61 is closed. Thus, the pressure loss caused by oil leakage may be prevented, and the efficiency of oil pumping may be further improved.

An engine cover according to embodiments of the present disclosure will be disclosed below.

The engine cover comprises an oil pump described with reference to the above embodiments. The engine cover comprises an engine cover body on which the shell 1 of the oil pump is integrally formed. By way of example, as shown in FIG. 4, the engine cover such as a front cover of the engine comprises an engine cover body 5, and the shell 1 of the oil pump is integral with the engine cover body 5.

Since the engine cover body is integral with the shell 1 of the oil pump, the engine may be simplified in structure, and the maintenance of the oil pump may be convenient.

According to embodiments of the present disclosure, an engine comprising the engine cover described with reference to the above embodiments is also provided. The engine comprises a cylinder cover, an engine cylinder block connected to a lower end of the cylinder cover, and an engine cover disposed at a front end of the cylinder cover and the engine cylinder block. A lower end of the engine cylinder block is connected to the shell 1 of the oil pump. In an embodiment, the engine cover comprises an engine cover body 5, and the shell 1 of the oil pump is integral with the engine cover body 5.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. An oil pump, comprising:
   a shell having an inlet and an outlet and defining a low-pressure oil chamber and a high-pressure oil chamber therein, the low-pressure oil chamber having a low-pressure oil passage connected to the inlet, the high-pressure oil chamber having a high-pressure oil passage connected to the outlet,
   a rotor mounting part disposed at an end of the shell and having a rotor supporting structure; and
   a rotor mechanism disposed on the rotor mounting part,
   wherein the high-pressure oil chamber and the low-pressure oil chamber are located at the same side of a periphery of the rotor mounting part,
   wherein a buffer chamber is defined between the low-pressure oil chamber and the high-pressure oil chamber, and
   wherein the buffer chamber, the high-pressure oil chamber and the low-pressure oil chamber are located at the same side of the periphery of the rotor mounting part.

2. The oil pump according to claim 1, further comprising a flow limiting wall disposed in the buffer chamber,
   wherein the flow limiting wall divides the buffer chamber into an inflowing buffer chamber and an outflowing buffer chamber connected to the inflowing buffer chamber via a pressure relief mechanism,
   wherein a barrier wall is disposed between the outflowing buffer chamber and the low-pressure oil chamber.

3. The oil pump according to claim 2, wherein the shell comprises a main shell body and a cover joined with the main shell body, the inlet and outlet formed in the cover,
   wherein the flow limiting wall comprises a first flow limiting wall portion formed on the cover, and a second flow limiting wall portion formed on the main shell body, and
   wherein a through hole connecting the inflowing buffer chamber and the outflowing buffer chamber is formed in the flow limiting wall, and the pressure relief mechanism is disposed in the through hole.

4. The oil pump according to claim 2, wherein the outflowing buffer chamber comprises a pressure relief channel adapted to change an outflowing direction,
   wherein the pressure relief channel comprises first and second pressure relief ports disposed symmetrically to each other.

5. The oil pump according to claim 4, wherein the first and second pressure relief ports each has a right-angled trapezoid shaped cross-section.

6. The oil pump according to claim 2, further comprising a partition wall disposed between the low-pressure oil chamber and the high-pressure oil chamber for separating the low-pressure oil chamber and the high-pressure oil chamber.

7. The oil pump according to claim 6, wherein the partition wall comprises:
   a main body portion adjacent to the outlet; and
   an extending portion extending from the main body portion to the rotor mounting part.

8. The oil pump according to claim 7, wherein a side of the extending portion facing to the high pressure oil chamber is tilted.

9. The oil pump according to claim 6, wherein the partition wall comprises a bolt hole formed at an end of the partition wall adjacent to the rotor mounting part.

10. The oil pump according to claim 9, wherein a width of the partition wall is 1.5 to 2 times of the maximum value of a diameter of the bolt hole.

11. The oil pump according to claim 2, wherein the barrier wall is disposed at a side of the inlet and parallel to an inflowing direction of an oil flowing into the low-pressure oil chamber through the inlet.

12. The oil pump according to claim 11, wherein a top end face of the barrier wall is a circular arc surface.

13. An engine cover, comprising:
    an engine cover body; and
    an oil pump disposed on the engine cover body, the oil pump further including:
      a shell having an inlet and an outlet and defining a low-pressure oil chamber and a high-pressure oil chamber therein, the low-pressure oil chamber having a low-pressure oil passage connected to the inlet, the high-pressure oil chamber having a high-pressure oil passage connected to the outlet,
      a rotor mounting part disposed at an end of the shell and having a rotor supporting structure; and
      a rotor mechanism disposed on the rotor mounting part,
    wherein the high-pressure oil chamber and the low-pressure oil chamber are located at the same side of a periphery of the rotor mounting part and the shell of the oil pump is integral with the engine cover,
    wherein a buffer chamber is defined between the low-pressure oil chamber and the high-pressure oil chamber, and
    wherein the buffer chamber, the high-pressure oil chamber and the low-pressure oil chamber are located at the same side of the periphery of the rotor mounting part.

14. An engine comprising an engine cover according to claim 13.

* * * * *